(12) United States Patent
Kim

(10) Patent No.: US 9,042,081 B2
(45) Date of Patent: May 26, 2015

(54) MULTILAYER CERAMIC CAPACITOR AND METHOD OF MANUFACTURING THE SAME

(71) Applicant: SAMSUNG ELECTRO-MECHANICS CO., LTD., Suwon, Gyunggi-do (KR)

(72) Inventor: Hyung Joon Kim, Gyunggi-do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 154 days.

(21) Appl. No.: 13/924,342

(22) Filed: Jun. 21, 2013

(65) Prior Publication Data

US 2014/0301012 A1    Oct. 9, 2014

(30) Foreign Application Priority Data

Apr. 8, 2013    (KR) .................. 10-2013-0038319

(51) Int. Cl.
| | |
|---|---|
| *H01G 4/06* | (2006.01) |
| *H01G 4/30* | (2006.01) |
| *H01G 4/012* | (2006.01) |
| *H01G 4/12* | (2006.01) |
| H01G 4/232 | (2006.01) |

(52) U.S. Cl.
CPC .................. *H01G 4/30* (2013.01); *H01G 4/012* (2013.01); *H01G 4/1209* (2013.01); *H01G 4/1227* (2013.01); *H01G 4/232* (2013.01)

(58) Field of Classification Search
USPC ............... 361/301.2, 301.4, 303–305, 306.1, 361/306.3, 311–313, 321.1, 321.2
See application file for complete search history.

(56) References Cited

U.S. PATENT DOCUMENTS

| | | | | |
|---|---|---|---|---|
| 7,545,626 | B1 * | 6/2009 | Kim et al. .................. | 361/321.2 |
| 7,697,262 | B2 * | 4/2010 | Ritter et al. ................ | 361/306.1 |
| 8,373,964 | B2 * | 2/2013 | Ahn et al. .................. | 361/301.4 |
| 8,644,000 | B2 * | 2/2014 | Dogan et al. ............... | 361/301.4 |
| 8,837,112 | B2 * | 9/2014 | Gu et al. .................... | 361/321.2 |
| 8,861,181 | B2 * | 10/2014 | Lee et al. ................... | 361/321.2 |

(Continued)

FOREIGN PATENT DOCUMENTS

| | | |
|---|---|---|
| JP | 2002-289433 A | 10/2002 |
| JP | 2005-159056 A | 6/2005 |

(Continued)

OTHER PUBLICATIONS

Korean Office Action issued in Korean Application No. 10-2013-0038319 dated Apr. 21, 2014, w/English translation.

*Primary Examiner* — Nguyen T Ha

(74) *Attorney, Agent, or Firm* — McDermott Will & Emery LLP

(57) ABSTRACT

There is provided a multilayer ceramic capacitor including: a ceramic body having first and second side surfaces opposite to each other, and third and fourth end surfaces connecting the first and second side surfaces; a plurality of internal electrodes formed in the ceramic body and having one ends thereof exposed to the third or fourth end surface; and first and second side margin parts formed from the first and second side surfaces to respective edges of the internal electrodes, the first and second side margin parts having an average thickness of 18 μm or less, wherein when a boundary surface between a cover layer and the first or second side margin part in the ceramic body is divided into two regions in a thickness direction of the ceramic body, a region adjacent to the internal electrode is S1, and a porosity of S1 is P1, 1≤P1≤20 is satisfied.

13 Claims, 9 Drawing Sheets

(56) References Cited

U.S. PATENT DOCUMENTS

2012/0229950 A1    9/2012    Kim et al.
2013/0208399 A1    8/2013    Morita et al.

FOREIGN PATENT DOCUMENTS

| | | |
|---|---|---|
| KR | 10-1141342 B1 | 5/2012 |
| WO | 2012/023334 A1 | 2/2012 |

* cited by examiner

A-A'

B-B'

MULTILAYER CERAMIC CAPACITOR AND METHOD OF MANUFACTURING THE SAME

CROSS-REFERENCE TO RELATED APPLICATIONS

This application claims the priority of Korean Patent Application No. 10-2013-0038319 filed on Apr. 8, 2013, in the Korean Intellectual Property Office, the disclosure of which is incorporated herein by reference.

BACKGROUND OF THE INVENTION

1. Field of the Invention

The present invention relates to a multilayer ceramic capacitor and a method of manufacturing the same, and more particularly, to a high capacitance multilayer ceramic capacitor having excellent reliability and a method of manufacturing the same.

2. Description of the Related Art

Generally, electronic components using a ceramic material, such as a capacitor, an inductor, a piezoelectric element, a varistor, a thermistor, or the like, include a ceramic body made of a ceramic material, internal electrodes formed in the ceramic body, and external electrodes mounted on surfaces of the ceramic body so as to be connected to the internal electrodes.

Among ceramic electronic components, a multilayer ceramic capacitor is configured to include a plurality of laminated dielectric layers, internal electrodes disposed to face each other, having the dielectric layer interposed therebetween, and external electrodes electrically connected to the internal electrodes.

Multilayer ceramic capacitors have been widely used as components in mobile communications devices such as laptop computers, personal digital assistances (PDAs), mobile phones, and the like, due to advantages thereof such as a small size, high capacitance, ease of mounting, or the like.

Recently, as electronic products have been miniaturized and multi-functionalized, chip components have also tended to be miniaturized and multi-functionalized. As a result, there is a need to miniaturize multilayer ceramic capacitors and increase the capacity thereof.

In order to increase the capacitance of multilayer ceramic capacitors, methods of making the dielectric layers thin, laminating the thinned dielectric layers, and improving coverage of the internal electrodes have been considered. In addition, a method of improving an area of the internal electrodes overlapped for forming capacitance has been considered.

In general, multilayer ceramic capacitors have been manufactured as follows. First, ceramic green sheets are prepared, and a conductive paste is printed on the ceramic green sheets to form internal electrodes. The ceramic green sheets having the internal electrodes formed thereon are stacked in an amount of several tens of layers to several hundreds of layers to fabricate a ceramic multilayer body. Thereafter, the ceramic multilayer body is compressed under conditions of high temperature and high pressure, and a cutting process is performed on the ceramic multilayer body to fabricate a green chip. Next, the green chip is calcined and sintered, and external electrodes are formed thereon, and thus, the manufacturing of a multilayer ceramic capacitor is completed.

In the case of manufacturing the multilayer ceramic capacitor by the above-described manufacturing method, since it is difficult to significantly decrease a margin part of the dielectric layer on which the internal electrode is not formed, there is a limitation in increasing the overlap area of the internal electrodes. In addition, since a margin part of an edge of the multilayer ceramic capacitor is formed to be thicker than a margin part of other regions of the multilayer ceramic capacitor, it is not easy to remove carbon therefrom at the time of calcining and sintering.

In order to solve the above-described problems, a method of forming the margin part on which the internal electrode is not formed in the previously manufactured ceramic multilayer body has been considered. However, such a method has a problem in that the manufactured ceramic multilayer body is vulnerable to impacts due to pores generated in a boundary surface of a cover region of the ceramic multilayer body and the margin part.

The related art document below discloses controlling porosity of a cover region of a ceramic multilayer body, but does not solve the above-described problems.

RELATED ART DOCUMENT (Patent Document 1) Japanese Patent Laid-Open Publication No. JP 2005-159056

SUMMARY OF THE INVENTION

An aspect of the present invention provides a high capacitance multilayer ceramic capacitor having excellent reliability and a method of manufacturing the same.

According to an aspect of the present invention, there is provided a multilayer ceramic capacitor including: a ceramic body having first and second side surfaces opposite to each other, and third and fourth end surfaces connecting the first and second side surfaces; a plurality of internal electrodes formed in the ceramic body and having one ends thereof exposed to the third or fourth end surface; and first and second side margin parts formed from the first and second side surfaces to respective edges of the internal electrodes, the first and second side margin parts having an average thickness of 18 μm or less, wherein when a boundary surface between a cover layer and the first or second side margin part in the ceramic body is divided into two regions in a thickness direction of the ceramic body, a region adjacent to the internal electrode is S1, and a porosity of S1 is P1, $1 \leq P1 \leq 20$ is satisfied.

The first and second side margin parts may be formed of ceramic slurry.

The plurality of internal electrodes may include a first internal electrode having one end exposed to the third end surface and the other end spaced apart from the fourth end surface by a predetermined interval, and a second internal electrode having one end exposed to the fourth end surface and the other end spaced apart from the third end surface by a predetermined interval.

According to another aspect of the present invention, there is provided a multilayer ceramic capacitor including: a ceramic body having first and second side surfaces opposite to each other, and third and fourth end surfaces connecting the first and second side surfaces; a plurality of internal electrodes formed in the ceramic body and having one ends thereof exposed to the third or fourth end surface; and first and second side margin parts formed from the first and second side surfaces to respective edges of the internal electrodes, the first and second side margin parts having an average thickness of 18 μm or less, wherein when a boundary surface between a cover layer and the first or second side margin part in the ceramic body is divided into two regions in a thickness direction of the ceramic body, a region adjacent to the internal electrode is S1, a region adjacent to an upper surface or a lower surface of the ceramic body is S2, a porosity of S1 is P1, and a porosity of S2 is P2, P1/P2>2 is satisfied.

The first and second side margin parts may be formed of ceramic slurry.

The plurality of internal electrodes may include a first internal electrode having one end exposed to the third end surface and the other end spaced apart from the fourth end surface by a predetermined interval, and a second internal electrode having one end exposed to the fourth end surface and the other end spaced apart from the third end surface by a predetermined interval.

According to another aspect of the present invention, there is provided a method of manufacturing a multilayer ceramic capacitor, the method including: preparing a first ceramic green sheet including a plurality of stripe shaped first internal electrode patterns having a predetermined interval therebetween and a second ceramic green sheet including a plurality of stripe shaped second internal electrode patterns having a predetermined interval therebetween; forming a ceramic green sheet multilayer body by stacking the first and second ceramic green sheets while allowing the stripe shaped first internal electrode patterns and the stripe shaped second internal electrode patterns to intersect with each other, and forming a cover layer by stacking a plurality of ceramic green sheets on at least one of an upper surface and a lower surface of the ceramic green sheet multilayer body; cutting the ceramic green sheet multilayer body into multilayer bodies while traversing the stripe shaped first and second internal electrode patterns such that first and second internal electrodes have a uniform width, each multilayer body having side surfaces to which edges of the first and second internal electrodes are exposed in a width direction of the multilayer body; and forming first and second side margin parts on the side surfaces to which the edges of the first and second internal electrodes are exposed, respectively, by using ceramic slurry, wherein the first and second side margin parts have an average thickness of 18 μm or less, and when a boundary surface between the cover layer and the first or second side margin part in the multilayer body is divided into two regions in a thickness direction of the multilayer body, a region adjacent to the internal electrode is S1, and a porosity of S1 is P1, $1 \leq P1 \leq 20$ is satisfied.

In the forming of the ceramic green sheet multilayer body, a central portion of the stripe shaped first internal electrode pattern and the predetermined interval between the stripe shaped second internal electrode patterns may be overlapped with each other.

The cutting of the ceramic green sheet multilayer body may include cutting the ceramic green sheet multilayer body into bar shaped multilayer bodies each having the side surfaces to which the edges of the first and second internal electrodes are exposed, and cutting a central portion of the first internal electrode and a predetermined interval between the second internal electrodes along the same cutting line to form the multilayer body having a third end surface and a fourth end surface to which one ends of the first and second internal electrodes are exposed, respectively, after the forming of the first and second side margin parts.

The cutting of the ceramic green sheet multilayer body may include cutting the ceramic green sheet multilayer body into bar shaped multilayer bodies each having the side surfaces to which the edges of the first and second internal electrodes are exposed; and cutting a central portion of the first internal electrode and a predetermined interval between the second internal electrodes in the bar shaped multilayer body along the same cutting line to form the multilayer body having a third end surface and a fourth end surface to which one ends of the first and second internal electrodes are exposed, respectively, before the forming of the first and second side margin parts.

The forming of the first side margin part and the second side margin part may be performed by applying the ceramic slurry to the side surfaces to which the edges of the first and second internal electrodes are exposed.

The forming of the first side margin part and the second side margin part may be performed by dipping the side surfaces, to which the edges of the first and second internal electrodes are exposed, into the ceramic slurry.

When the boundary surface between the cover layer and the first or second side margin part in the ceramic green sheet multilayer body is divided into two regions in the thickness direction, a region adjacent to an upper surface or a lower surface of the ceramic green sheet multilayer body is S2, and a porosity of S2 is P2, P1/P2>2 may be satisfied.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
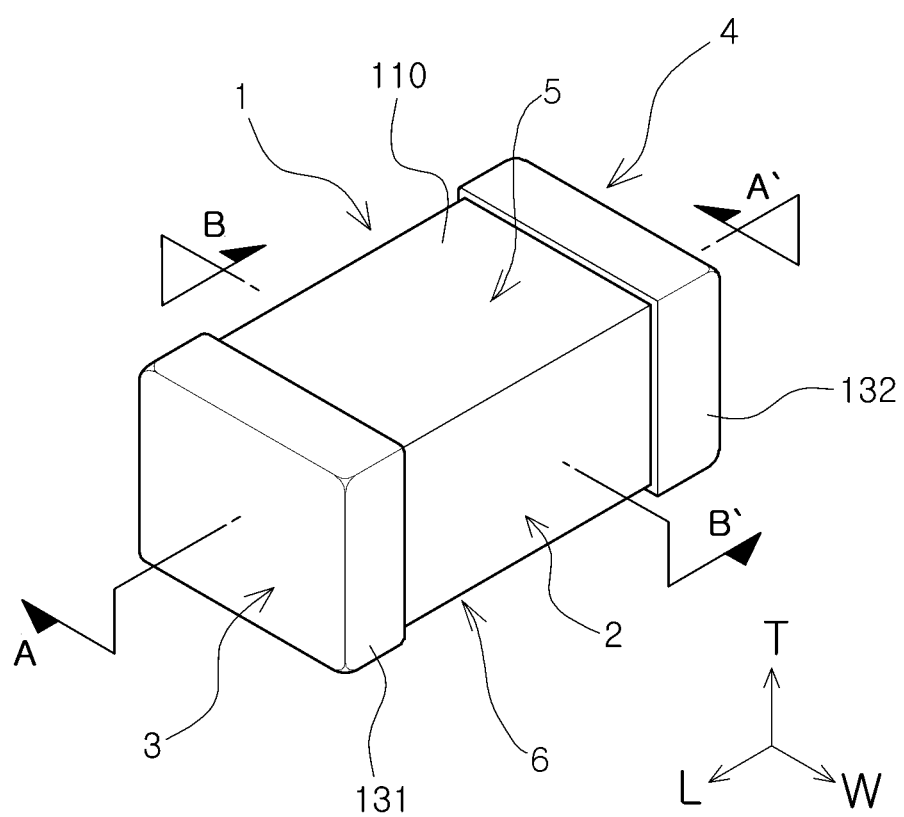
FIG. 1 is a schematic perspective view showing a multilayer ceramic capacitor according to an embodiment of the present invention.

Embodiments of the present invention will now be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

FIG. 1 is a schematic perspective view showing a multilayer ceramic capacitor according to an embodiment of the present invention.

Figure 2:
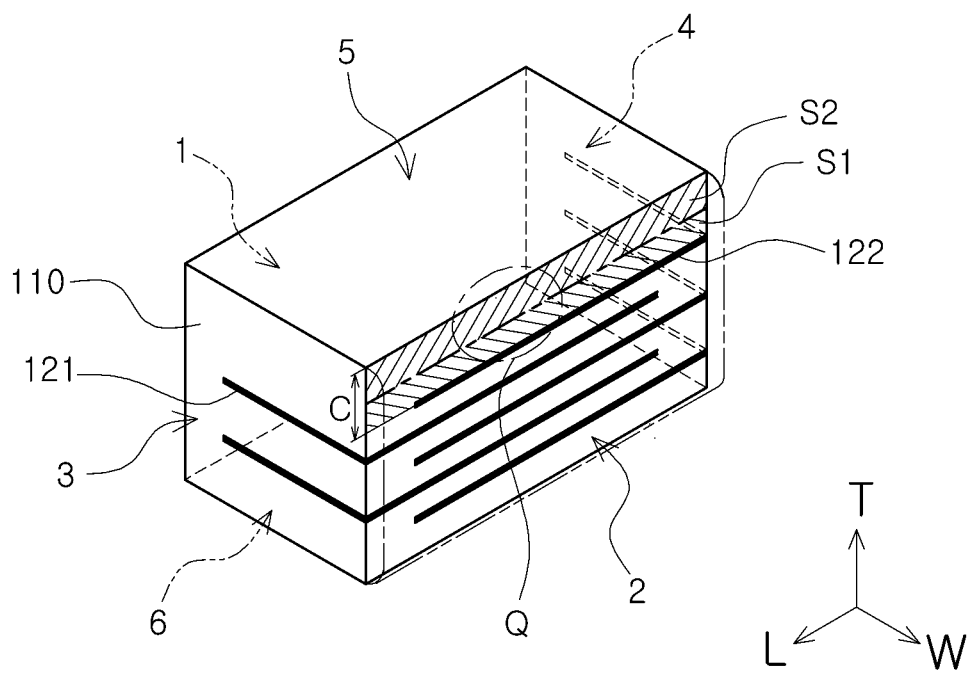
FIG. 2 is a schematic perspective view showing a ceramic body of the multilayer ceramic capacitor shown in FIG. 1.

FIG. 2 is a schematic perspective view showing a ceramic body of the multilayer ceramic capacitor shown in FIG. 1.

Figure 3:
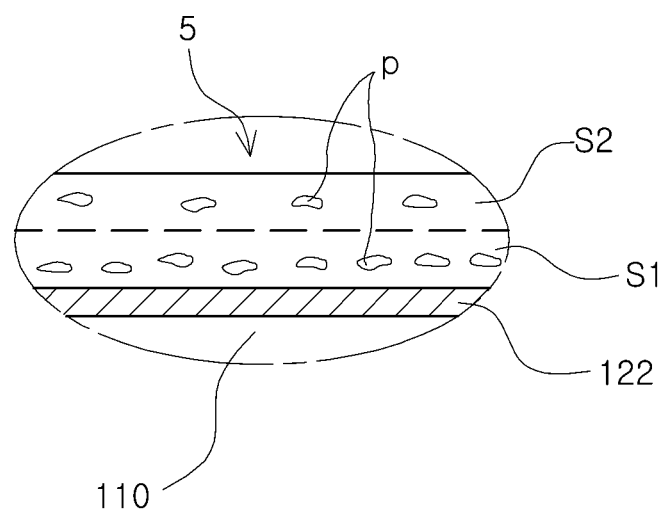
FIG. 3 is an enlarged view of region Q of FIG. 2.

FIG. 3 is an enlarged view of region Q of FIG. 2.

Figure 4:
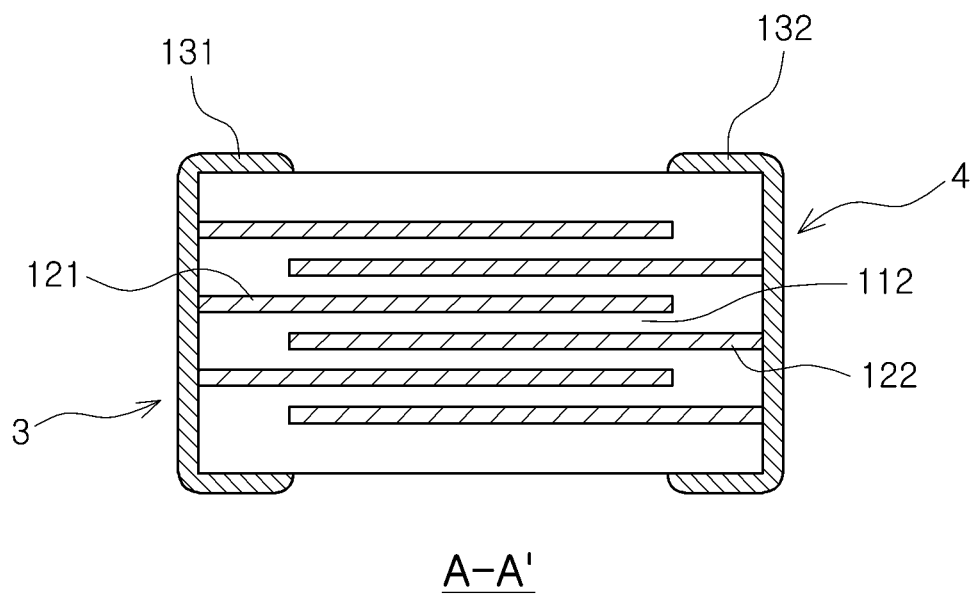
FIG. 4 is a cross-sectional view taken along line A-A' of FIG. 1.
Figure 5:
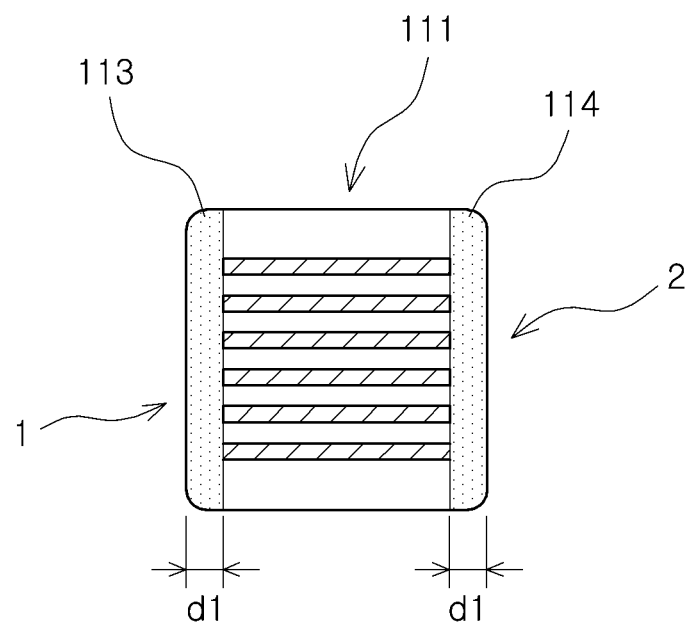
FIG. 5 is a cross-sectional view taken along line B-B' of FIG. 1.
Figure 6:
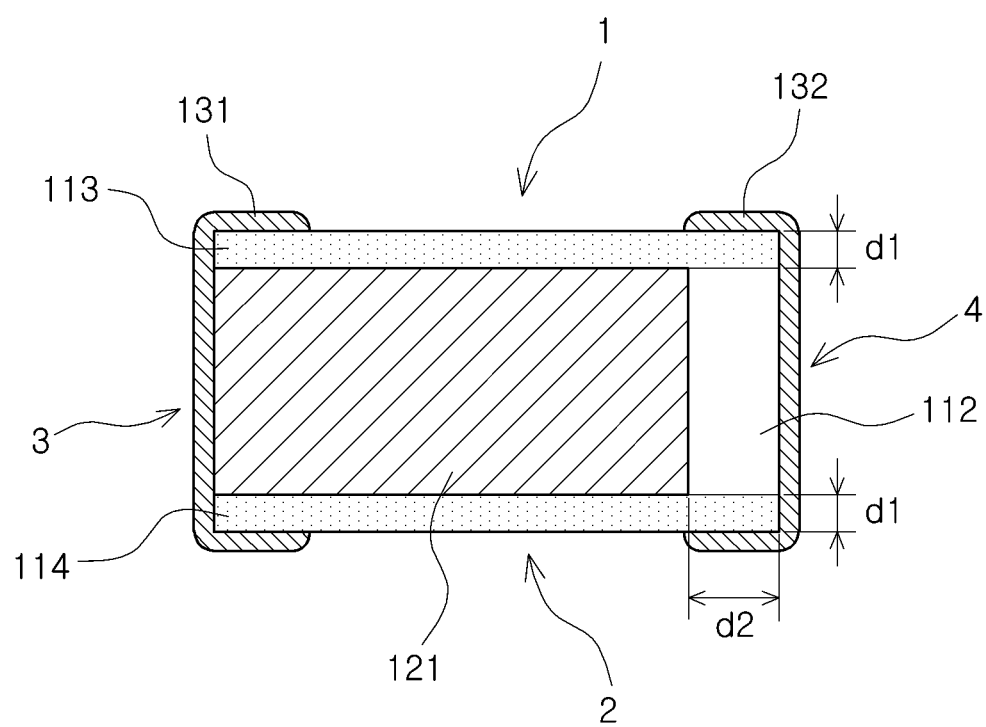
FIG. 6 is a top plan view showing one dielectric layer configuring the multilayer ceramic capacitor shown in FIG. 1.

FIG. 4 is a cross-sectional view taken along line A-A' of FIG. 1, FIG. 5 is a cross-sectional view taken along line B-B' of FIG. 1, and FIG. 6 is a top plan view showing one dielectric layer configuring the multilayer ceramic capacitor shown in FIG. 1.

Referring to FIGS. 1 through 6, the multilayer ceramic capacitor according to the embodiment of the present invention may include a ceramic body 110; a plurality of internal electrodes 121 and 122 formed in the ceramic body; and external electrodes 131 and 132 formed on outer surfaces of the ceramic body.

The ceramic body 110 may have a first side surface 1 and a second side surface 2 opposing each other, and a third end surface 3 and a fourth end surface 4 connecting the first side surface 1 and the second side surface 2 to each other.

A shape of the ceramic body 110 is not specifically limited, but the ceramic body 110 may have a rectangular parallelepiped shape, as shown.

The plurality of internal electrodes 121 and 122 formed in the ceramic body 110 may have one ends thereof exposed to the third end surface 3 or the fourth end surface 4 of the ceramic body.

The internal electrodes 121 and 122 may be configured of a pair of first and second internal electrodes 121 and 122 having different polarities. One end of the first internal electrode 121 may be exposed to the third end surface 3 and one end of the second internal electrode 122 may be exposed to the fourth end surface 4. The other ends of the first internal electrode 121 and the second internal electrode 122 may be spaced apart from the third end surface 3 or the fourth end surface 4 by a predetermined interval. A detailed description thereof will be described below.

The first and second external electrodes 131 and 132 may be formed on the third end surface 3 and the fourth end surface 4 of the ceramic body, respectively, and may be electrically connected to the internal electrodes.

The plurality of internal electrodes may be formed within the ceramic body, and a distance d1 from respective edges of the plurality of internal electrodes to the first side surface or the second side surface may be 18 μm or less. This means that the distance d1 from the respective edges of the plurality of internal electrodes to the first side surface or the second surface is 18 μm or less on average.

The edges of the internal electrode may refer to portions of the internal electrode adjacent to the first side surface 1 or the second side surface 2 of the ceramic body. Regions from the edges of the internal electrode to the first side surface and the second side surface may be referred to as a first side margin part 113 and a second side margin part 114, respectively.

The distance d1 from the respective edges of the internal electrode to the first side surface 1 or the second side surface 2 may have a slight difference between the plurality of internal electrodes, but according to the embodiment of the invention, there is a slight or no difference in the distance d1. The above-described features may be more clearly appreciated by a method of manufacturing the multilayer ceramic capacitor according to the embodiment of the invention.

According to the embodiment of the invention, the ceramic body 110 may be configured of a multilayer body 111 having a plurality of dielectric layers 112 laminated therein and the first side margin part 113 and the second side margin part 114 formed on both side surfaces of the multilayer body 111. In this case, the distance d1 from respective edges of the plurality of internal electrodes to the first side surface or the second side surface is defined by the first side margin part 113 and the second side margin part 114, which corresponds to a thickness of the first side margin part 113 or the second side margin part 114.

The plurality of dielectric layers 112 configuring the multilayer body 111 are in a sintered state and may be integrated such that boundaries between adjacent dielectric layers may not be readily apparent.

A length of the multilayer body 111 corresponds to a length of the ceramic body 110, and the length of the ceramic body 110 corresponds to a distance from the third end surface 3 to the fourth end surface 4 of the ceramic body. That is, the third and fourth end surfaces of the ceramic body 110 may be referred to as the third end surface and the fourth end surface of the multilayer body 111.

The multilayer body 111 is formed by stacking the plurality of dielectric layers 112, and a length of the dielectric layer 112 corresponds to the distance from the third end surface 3 to the fourth end surface 4 of the ceramic body.

The length of the ceramic body according to the embodiment of the invention may be 400 to 1400 μm, but is not limited thereto. More specifically, the length of the ceramic body may be 400 to 800 μm, or 600 to 1400 μm.

The internal electrodes 121 and 122 may be formed on the dielectric layers 112, and the internal electrodes 121 and 122 may be formed in the ceramic body by sintering, having one dielectric layer interposed therebetween.

Referring to FIG. 6, the first internal electrode 121 may be formed on the dielectric layer 112. The first internal electrode 121 is not entirely formed in a length direction of the dielectric layer. That is, one end of the first internal electrode 121 may be formed to have a predetermined interval d2 from the fourth end surface 4 of the ceramic body, and the other end of the first internal electrode 121 may be formed up to the third end surface 3 of the ceramic body to thereby be exposed to the third end surface 3.

The other end of the first internal electrode exposed to the third end surface 3 may be connected to the first external electrode 131.

Contrary to the first internal electrode, one end of the second internal electrode 122 may be formed to have a predetermined interval from the third end surface 3, and the other end of the second internal electrode 122 may be exposed to the fourth end surface 4 to thereby be connected to the second external electrode 132.

The dielectric layer 112 may have the same width as that of the first internal electrode 121. That is, the first internal electrode 121 may be entirely formed in the width direction of the dielectric layer 112. The width of the dielectric layer and the width of the internal electrode may be based on the first side surface and the second side surface of the ceramic body.

The width of the dielectric layer and the width of the internal electrode according to the embodiment of the invention may be 100 to 900 μm, but are not limited thereto. More specifically, the width of the dielectric layer and the width of the internal electrode may be 100 to 500 μm, or 100 to 900 μm.

As the ceramic body is miniaturized, the thickness of the side margin part may have an influence on electrical properties of the multilayer ceramic capacitor. According to the embodiment of the invention, the thickness of the side margin part is formed to be 18 μm or less, thereby improving the properties of the miniaturized multilayer ceramic capacitor.

In the embodiment of the invention, the internal electrode and the dielectric layer may be simultaneously cut to be formed, and may have the same width. A detailed description thereof will be described below.

In the embodiment of the invention, the width of the dielectric layer is the same as the width of the internal electrode, and the edges of the internal electrode may be exposed to the first and second side surfaces of the multilayer body. Both side surfaces of the multilayer body to which the edges of the internal electrode are exposed may be provided with the first side margin part 113 and the second side margin part 114.

As described above, the distance d1 from the respective edges of the plurality of internal electrodes to the first side surface or the second side surface corresponds to the thickness of the first side margin part 113 or the second side margin part 114.

The first side margin part 113 and the second side margin part 114 may have a thickness of 18 μm or less. As the thickness of the first side margin part 113 or the second side margin part 114 is reduced, the overlap area of the internal electrodes formed in the ceramic body may be relatively increased.

As far as the first side margin part 113 and the second side margin part 114 have a thickness sufficient to prevent short circuits of the internal electrodes exposed to the side surfaces of the multilayer body 111, the thickness of the first side margin part 113 or the second side margin part 114 is not particularly limited. For example, the first side margin part 113 and the second side margin part 114 may have a thickness of 2 μm or more.

In the case in which the thickness of the first and second side margin parts is less than 2 μm, mechanical strength against external impacts may be deteriorated, and in the case in which the thickness of the first and second side margin parts is above 18 μm, the overlap area of the internal electrodes is relatively decreased, such that it may be difficult to secure high capacitance of the multilayer ceramic capacitor.

According to the embodiment of the invention, the first side margin part 113 and the second side margin part 114 may be formed of ceramic slurry. It is easy to control the thickness of the first side margin part 113 and the second side margin part 114 by controlling an amount of the ceramic slurry, and the first side margin part 113 and the second side margin part 114 may be thin, a small thickness of 18 μm or less.

The thickness of the first side margin part 113 and the second side margin part 114 may refer to an average thickness of the margin parts.

The average thickness of the first side margin part 113 and the second side margin part 114 may be measured on an image obtained by scanning a cross section of the ceramic body 110 in a width direction thereof using a scanning electron microscope (SEM).

For example, with respect to either of the first side margin part 113 and the second side margin part 114 extracted from the image obtained by scanning the cross section of the ceramic body 110 in a width-thickness (W-T) direction that is cut in a central portion of the ceramic body 110 in a length (L) direction using the SEM as shown in FIG. 5, thicknesses at any three points of the upper, middle, and lower portions of either of the margin parts in the thickness direction of the ceramic body may be measured to obtain an average value, as shown in FIG. 5.

In order to significantly increase the capacitance of the multilayer ceramic capacitor, methods of thinning the dielectric layers, laminating the thinned dielectric layers, and improving coverage of the internal electrodes have been considered. In addition, a method of increasing an overlap area of the internal electrodes forming capacitance has been considered. In order to increase the overlap area of the internal electrodes, the margin parts in which the internal electrodes are not formed are significantly decreased. In particular, as the multilayer ceramic capacitor is miniaturized, the margin parts need to be significantly decreased in order to increase the overlap area of the internal electrodes.

According to the embodiment of the invention, the internal electrode is formed across the entire dielectric layer in the width direction thereof, and the thickness of the side margin part is set to be 18 μm or less, such that the overlap area of the internal electrodes is large.

In general, as the dielectric layers are highly laminated, the thicknesses of the dielectric layers and the internal electrodes are reduced. Therefore, short-circuits may frequently occur in the internal electrodes. In addition, in the case in which the internal electrodes are partially formed on the dielectric layers, steps caused by the internal electrodes may degrade accelerated lifespan or reliability of insulation resistance.

However, according to the embodiment of the invention, even in the case that the internal electrodes and the dielectric layers are formed to be thin, since the internal electrodes are entirely formed in the width direction of the dielectric layer, the overlap area of the internal electrodes may be increased to significantly increase the capacitance of the multilayer ceramic capacitor.

In addition, the steps caused by the internal electrodes are decreased to improve the accelerated lifespan of the insulation resistance, whereby a multilayer ceramic capacitor having excellent capacitance properties and excellent reliability may be provided.

Meanwhile, pores p may be generated in boundary surfaces between the multilayer body 111 and the first and second side margin parts 113 and 114 in the ceramic body 110.

In particular, the multilayer ceramic capacitor may be vulnerable to impacts due to the pores p generated in a boundary surface between a cover layer C and the side margin part in the ceramic body 110.

According to the embodiment of the invention, when the boundary surface between the cover layer C and the side margin parts 113 and 114 in the ceramic body 110 is divided into two regions in the thickness direction, a region adjacent to the internal electrode is S1, and a porosity of S1 is P1, $1 \leq P1 \leq 20$ may be satisfied.

The porosity P1 of S1 is controlled to satisfy $1 \leq P1 \leq 20$ to thereby alleviate external impacts such as thermal shock, electrolysis shock, or the like, whereby a multilayer ceramic capacitor having high reliability and high capacitance may be obtained.

A method of controlling the porosity P1 of S1 to satisfy $1 \leq P1 \leq 20$ is not particularly limited, but for example, the method may be implemented by controlling the content of glass added to a ceramic paste used at the time of manufacturing a ceramic green sheet forming the cover layer C.

The porosity P1 of S1 may be defined by a ratio of an area occupied by the region S1 adjacent to the internal electrode to an area occupied by the pores.

The porosity P1 of S1 may be measured on an image obtained by scanning a cross section of the ceramic body 110 in the length direction using a scanning electron microscope (SEM) as shown in FIG. 2.

For example, with respect to any one of the cover layers extracted from the image obtained by scanning the cross section of the ceramic body 110 in a length and thickness (L-T) direction obtained by cutting the boundary surface of the multilayer body 111 and the side margin part 113 or 114 in the width direction of the ceramic body 110, using the SEM, as shown in FIG. 2, when the boundary surface is divided into two regions in the thickness direction, the region S1 adjacent to the internal electrode may be divided into thirty equidistant regions in the length direction and the porosity in any one of the thirty equidistant regions may be measured.

The any one of the thirty equidistant regions may be a central region in the length direction of the ceramic body, but is not limited thereto.

In the case in which the porosity P1 of S1 is less than 1, thermal shock and sintering crack may occur, and in the case in which the porosity P1 of S1 is above 20, moisture-resistance characteristics may be deteriorated, and thus, the strength of the ceramic body may be deteriorated.

In the multilayer ceramic capacitor according to this embodiment of the invention, when the boundary surface between the cover layer C and the side margin part 113 or 114 in the ceramic body 110 is divided into two regions in the thickness direction, the region adjacent to the internal electrode is S1, a region adjacent to an upper surface 5 or a lower surface 6 of the ceramic body is S2, a porosity of S1 is P1, and a porosity of S2 is P2, P1/P2>2 may be satisfied.

The porosity P2 of S2 may be defined by a ratio of an area occupied by the region S2 adjacent to the upper surface 5 or the lower surface 6 of the ceramic body 110 to an area occupied by the pores.

The porosity P1 of S1 and the porosity P2 of S2 are controlled to satisfy P1/P2>2 to thereby alleviate external impacts such as thermal shock, electrolysis shock, or the like, whereby a multilayer ceramic capacitor having high reliability and high capacitance may be obtained.

In the case in which a value of P1/P2 is less than 2, problems such as thermal shock and sintering crack may occur.

A multilayer ceramic capacitor according to another embodiment of the present invention has the same features as those of the multilayer ceramic capacitor according to the above-described embodiment of the present invention except for the above-described features, and therefore, the detailed description thereof will be omitted.

Hereinafter, a method of manufacturing a multilayer ceramic capacitor according to another embodiment of the present invention will be described.

FIGS. 7A through 7F are cross-sectional views and perspective views schematically showing a method of manufacturing a multilayer ceramic capacitor according to another embodiment of the present invention.

Figure 7A:
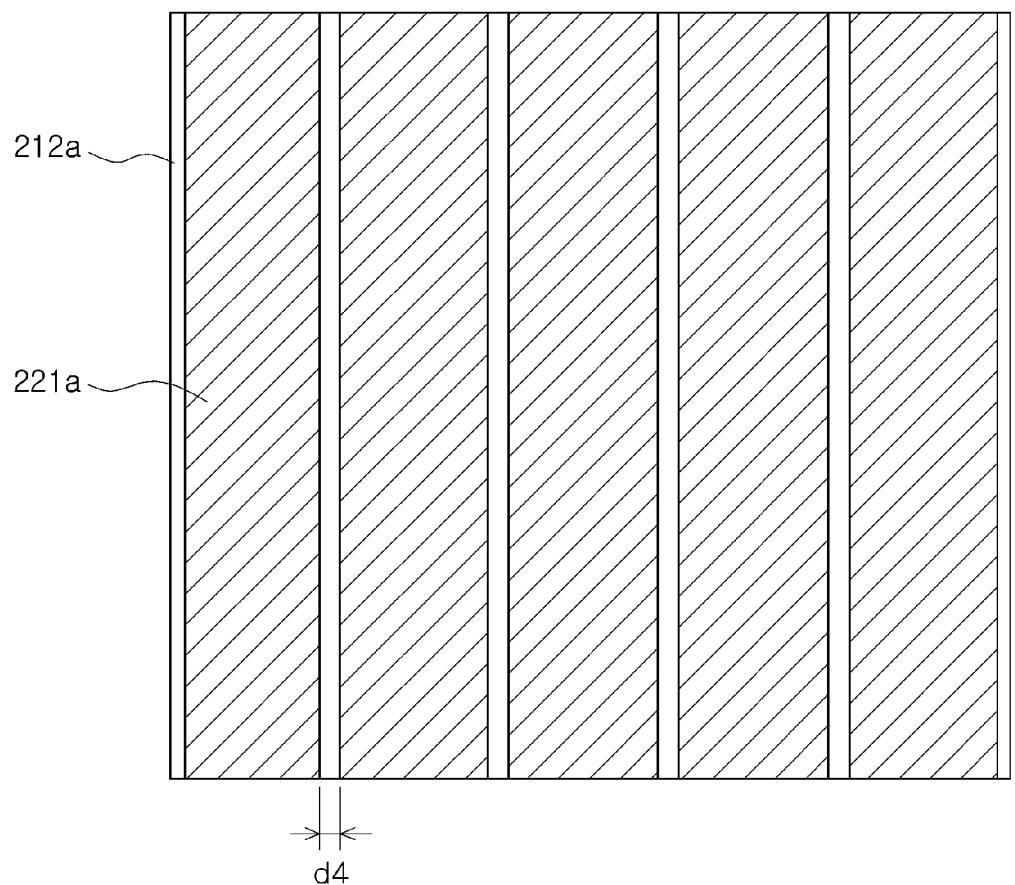
FIGS. 7A through 7F are cross-sectional views and perspective views schematically showing a method of manufacturing a multilayer ceramic capacitor according to another embodiment of the present invention.

As shown in FIG. 7A, a plurality of stripe shaped first internal electrode patterns 221a may be formed on a ceramic green sheet 212a with a predetermined interval d4 therebetween. The plurality of stripe shaped first internal electrode patterns 221a may be formed in parallel with each other.

The predetermined interval d4, corresponding to a distance for insulation between the internal and external electrodes having different polarities, may be a distance d2×2 shown in FIG. 6.

The ceramic green sheet 212a may be formed of a ceramic paste including ceramic powder, an organic solvent, and an organic binder.

As the ceramic powder, a material having high permittivity, such as barium titanate ($BaTiO_3$) based material, lead complex perovskite based material, strontium titanate ($SrTiO_3$) based material, or the like may be used, but is not limited thereto, and preferably, barium titanate ($BaTiO_3$) powder may be used. The ceramic green sheet 212a may be sintered to be the dielectric layer 112 configuring the ceramic body.

The stripe shaped first internal electrode patterns 221a may be formed of an internal electrode paste including a conductive metal. The conductive metal may be Ni, Cu, Pd, or an alloy thereof, but is not limited thereto.

A method of forming the stripe shaped first internal electrode patterns 221a on the ceramic green sheet 212a is not particularly limited, but for example, a printing method such as a screen printing method or a gravure printing method may be used.

In addition, although not shown, a plurality of stripe shaped second internal electrode patterns 222a may be formed on another ceramic green sheet 212a with a predetermined interval therebetween.

Hereinafter, the ceramic green sheet having the first internal electrode patterns 221a formed thereon may refer to a first ceramic green sheet and the ceramic green sheet having the second internal electrode patterns 222a formed thereon may refer to a second ceramic green sheet.

Figure 7B:
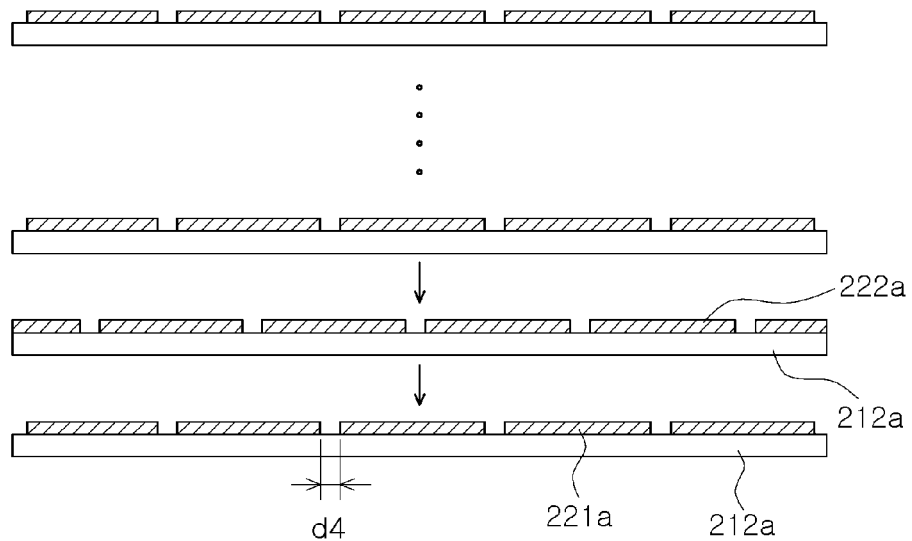

Then, as shown in FIG. 7B, the first and second ceramic green sheets may be alternately stacked so that the stripe shaped first internal electrode patterns 221a and the stripe shaped second internal electrode patterns 222a intersect with one another.

Next, the stripe shaped first internal electrode patterns 221a may form the first internal electrodes 121, and the stripe shaped second internal electrode patterns 222a may form the second internal electrodes 122.

Figure 7C:
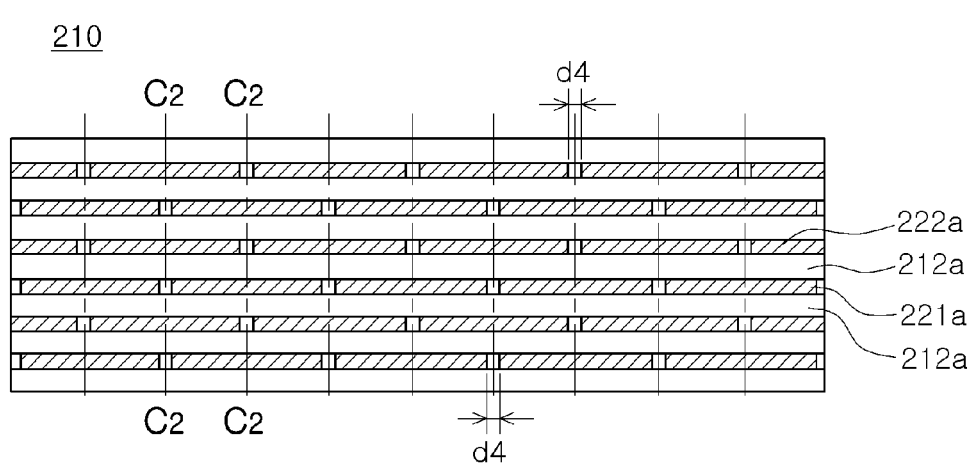
Figure 7D:
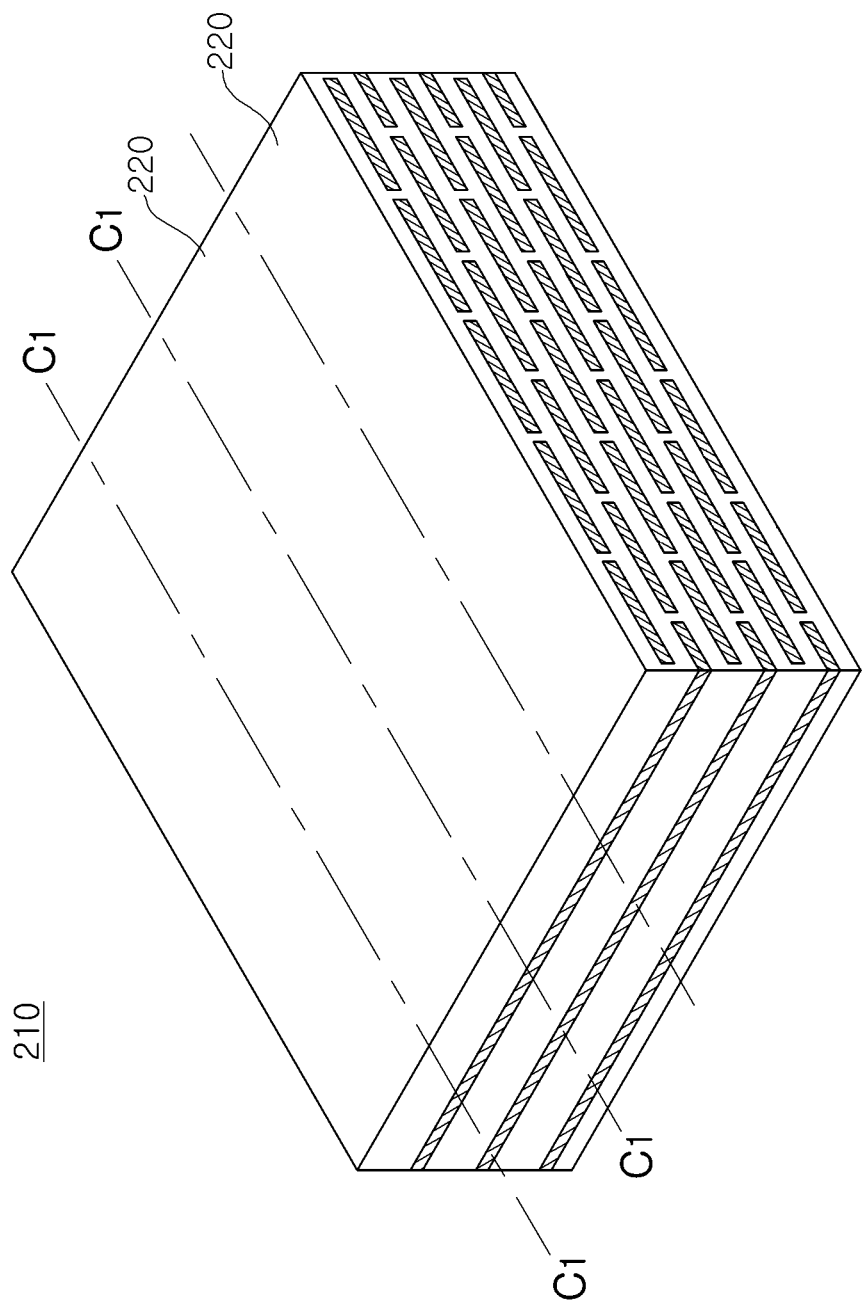

FIG. 7C is a cross-sectional view showing a ceramic green sheet multilayer body 210 having the first and second ceramic green sheets stacked therein according to the embodiment of the invention, and FIG. 7D is a perspective view showing the ceramic green sheet multilayer body 210 having the first and second ceramic green sheets stacked therein according to the embodiment of the invention.

Referring to FIGS. 7C and 7D, the first ceramic green sheet having the plurality of stripe shaped first internal electrode patterns 221a printed thereon in parallel with each other and the second ceramic green sheet having the plurality of stripe shaped second internal electrode patterns 222a printed thereon in parallel with each other are alternately stacked.

More specifically, when the first and second ceramic green sheets are alternately stacked, a central portion of the stripe shaped first internal electrode pattern 221a printed on the first ceramic green sheet and the interval d4 between the stripe shaped second internal electrode patterns 222a printed on the second ceramic green sheet may be overlapped with each other.

Then, as shown in FIG. 7D, the ceramic green sheet multilayer body 210 may be cut to traverse the plurality of stripe shaped first internal electrode patterns 221a and the plurality of stripe shaped second internal electrode patterns 222a. That is, the ceramic green sheet multilayer body 210 may be cut along a cutting line C1-C1 to form bar shaped multilayer bodies 220.

More specifically, the stripe shaped first internal electrode patterns 221a and the stripe shaped second internal electrode patterns 222a may be cut in the length direction to be divided into a plurality of internal electrodes having a uniform width. Here, the stacked ceramic green sheets are cut together with the internal electrode patterns. Therefore, the dielectric layer may be formed to have the same width as the internal electrode.

Edges of the first and second internal electrodes may be exposed through cut surfaces of the bar shaped multilayer body 220. The cut surfaces of the bar shaped multilayer body may refer to the first side surface and the second side surface of the bar shaped multilayer body, respectively.

After the ceramic green sheet multilayer body is sintered, the ceramic green sheet multilayer body may be cut into the bar shaped multilayer bodies. Alternatively, after the ceramic green sheet multilayer body is cut into the bar shaped multilayer bodies, a sintering process may be performed. The sintering process may be performed under $N_2$—$H_2$ atmosphere at 1100° C. to 1300° C., but is not limited thereto.

Figure 7E:
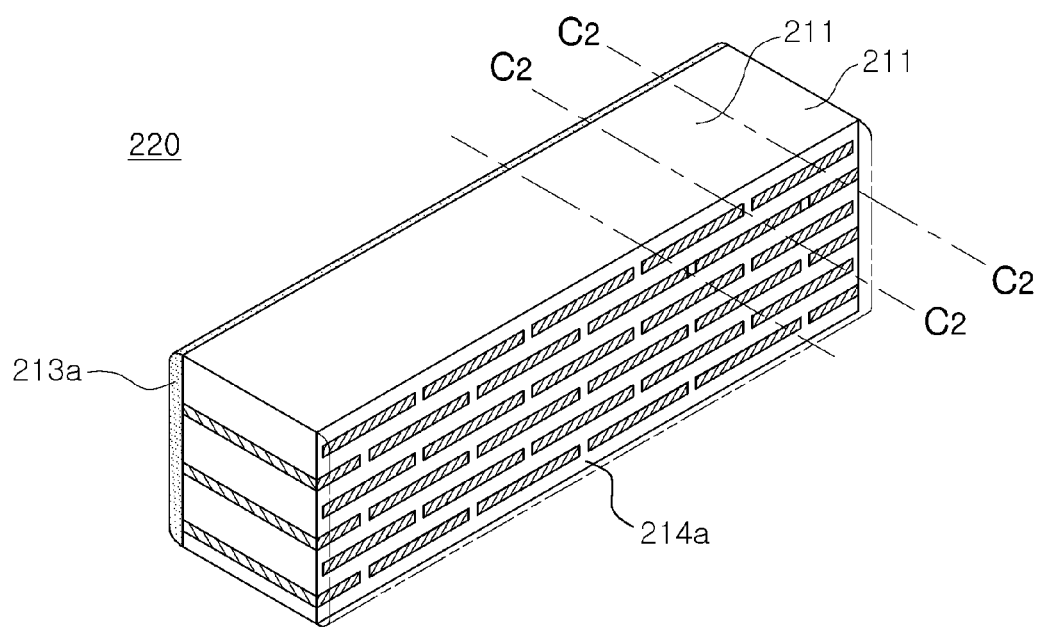

Then, as shown in FIG. 7E, the first and second side surfaces of the bar shaped multilayer body 220 may be provided with a first side margin part 213a and a second side margin part 214a, respectively. The second side margin part 214a is not clearly shown, but the outline thereof is shown by dotted lines.

It may be appreciated that the first and second side surfaces of the bar shaped multilayer body 220 correspond to the first side surface 1 and the second side surface 2 of the multilayer body 111 shown in FIG. 5.

The first and second side margin parts 213a and 214a may be formed on the bar shaped multilayer body 220 using ceramic slurry including ceramic powder.

The ceramic slurry may include the ceramic powder, an organic binder, and an organic solvent, and an amount of the ceramic slurry may be controlled to allow the first and second side margin parts 213a and 214a to have a desired thickness.

The first and second side margin parts 213a and 214a may be formed on the first and second side surfaces of the bar shaped multilayer body 220 by applying the ceramic slurry thereto. A method of applying the ceramic slurry is not particularly limited. For example, the application of the ceramic slurry may be performed using a spraying method or using a roller.

In addition, the first and second side margin parts 213a and 214a may be formed on the first and second side surfaces of the bar shaped multilayer body by dipping the bar shaped multilayer body into the ceramic slurry.

As described above, the first side margin part and the second side margin part may have an average thickness of 18 μm or less. The thickness of the first and the second side margin parts may be defined based on the first side surface or the second side surface of the bar shaped multilayer body to which the edges of the internal electrode are exposed.

Figure 7F:
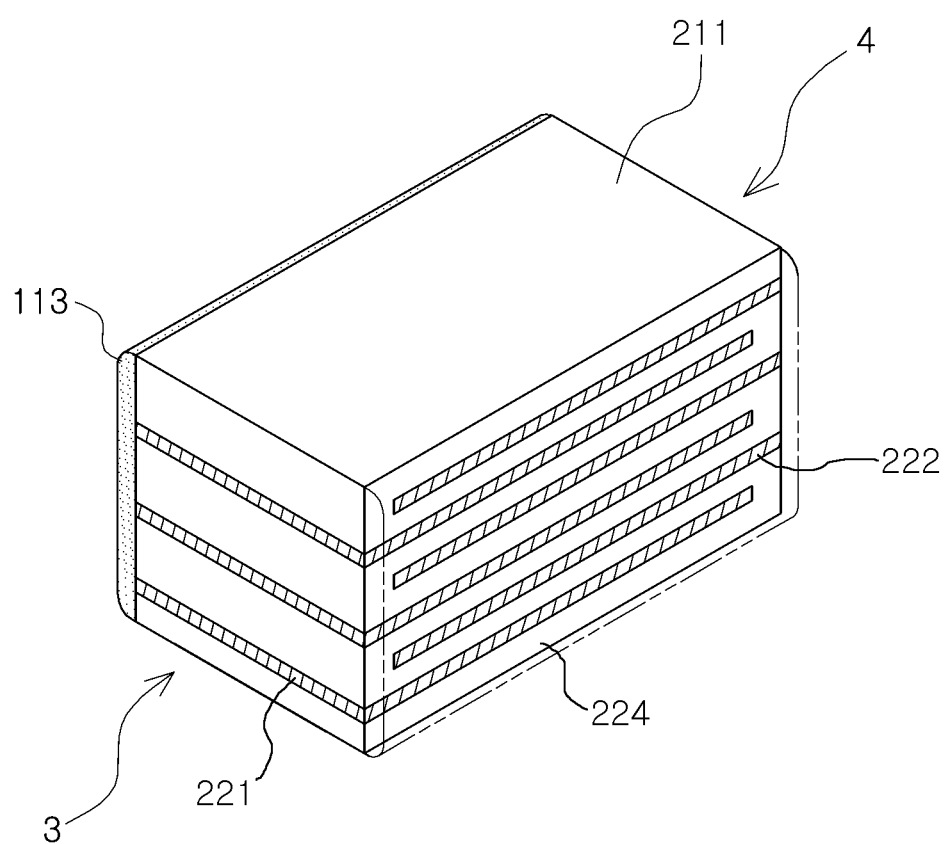

Next, as shown in FIGS. 7E and 7F, the bar shaped multilayer body 220 having the first and second side margin parts 213a and 214a formed thereon may be cut along a cutting line C2-C2 so as to correspond to individual chip size. FIG. 7C may be used to recognize a position of the cutting line C2-C2.

The bar shaped multilayer body 220 is cut according to a chip size, so that a ceramic body having the multilayer body 111 and the first and second side margin parts 113 and 114 formed on both side surfaces of the multilayer body may be formed.

Since the bar shaped multilayer body 220 is cut along the cutting line C2-C2, the central portion of the first internal electrode and the predetermined interval d4 formed between the second internal electrodes overlapped with each other may be cut along the same cutting line. From a different point of view, the central portion of the second internal electrode and the predetermined interval formed between the first internal electrodes may be cut along the same cutting line.

Therefore, one ends of the first internal electrode and the second internal electrode may be alternately exposed to the cutting line C2-C2. A surface to which the first internal electrode is exposed may be the third end surface 3 of the multilayer body shown in FIG. 6, and a surface on which the second internal electrode is exposed may be the fourth end surface 4 of the multilayer body shown in FIG. 6.

The bar shaped multilayer body 220 is cut along the cutting line C2-C2, such that the predetermined interval d4 between the stripe shaped first internal electrode patterns 221a is cut into half, as a result, the end of the first internal electrode 121 may be spaced apart from the fourth end surface by the predetermined interval d2. In addition, the second internal electrode 122 may be spaced apart from the third end surface by a predetermined interval.

Then, external electrodes may be formed on the third end surface and the fourth end surface so as to be connected to one end of the first and second internal electrodes, respectively.

As described in the embodiment of the invention, in the case in which the first and second side margin parts are formed on the bar shaped multilayer body 220 and the bar shaped multilayer body 220 is cut into a plurality of multilayer bodies having a chip size, the side margin parts may be formed on the plurality of multilayer bodies 111 through a single process.

Although not shown, the bar shaped multilayer body may be cut according to a chip size to thereby form the plurality of multilayer bodies before the first and second side margin parts are formed.

That is, the bar shaped multilayer body may be cut so that the central portion of the first internal electrode and the predetermined interval formed between the second internal electrodes overlapped with each other are cut along the same cutting line. Therefore, the ends of the first internal electrode and the second internal electrode may be alternately exposed to the cut surface.

Then, the first side margin part and the second side margin part may be formed on the first and second side surfaces of the multilayer body. The first and second side margin parts may be formed by the above-described method.

Further, the external electrodes may be formed on the third end surface of the multilayer body to which the first internal electrode is exposed and the fourth end surface of the multilayer body to which the second internal electrode is exposed, respectively.

According to another embodiment of the invention, the edges of the first and second internal electrodes are exposed through the first and second side surfaces of the multilayer body. The plurality of stacked first and second internal electrodes may be simultaneously cut, such that the edges of the internal electrodes may be positioned in a single straight line. Then, the first and second side margin parts may be formed on the first and second side surfaces of the multilayer body. The multilayer body and the first and second side margin parts may form the ceramic body. That is, the first and second side margin parts may form the first and second side surfaces of the ceramic body.

Therefore, according to the embodiment of the invention, the distance from the respective edges of the plurality of internal electrodes to the first and second side surfaces of the ceramic body may be uniform. In addition, the first and second side margin parts may be formed to be thin using the ceramic paste.

Further, the porosity P1 of S1 may satisfy $1 \leq P1 \leq 20$ and the porosity P1 of S1 and the porosity P2 of S2 may satisfy $P1/P2>2$, by controlling the content of glass added to the ceramic paste used at the time of manufacturing the ceramic green sheet forming the cover layer C of the multilayer ceramic capacitor.

As a result, according to the embodiment of the invention, external impacts such as thermal shock, electrolysis shock, or the like may be alleviated, whereby a multilayer ceramic capacitor having high reliability and high capacitance may be realized.

Table 1 below shows reliability of multilayer ceramic capacitors according to the porosity P1 of S1 and the ratio P1/P2 of the porosity P1 of S1 to the porosity P2 of S2 with regard to an average thickness of side margin parts of the multilayer ceramic capacitors.

TABLE 1

| Sample No. | Average Thickness of Side Margin Parts (μm) | Porosity P1 of Region S1 | Ratio P1/P2 of Porosity of Region S1 to Porosity of Region S2 | Reliability Evaluation (Number of Cracks/Total Number) |
|---|---|---|---|---|
| *1 | 16 | 0.5 | 2.0 | 3/200 |
| *2 | 17 | 0.5 | 2.0 | 2/200 |
| *3 | 18 | 0.5 | 2.0 | 2/200 |
| 4 | 19 | 0.5 | 2.0 | 0/200 |
| 5 | 20 | 0.5 | 2.0 | 0/200 |
| 6 | 21 | 0.5 | 2.0 | 0/200 |

Referring to Table 1, samples 1 to 3, in which the average thickness of the side margin parts is 18 μm or less, had problems in the reliability test, in the case in which the ratio P1/P2 of the porosity P1 of S1 to the porosity P2 of S2 was outside of the numerical range of the present inventive concept.

Samples 4 to 6, in which the average thickness of the side margin parts is 18 μm or more, showed an excellent result in the reliability test, even in the case in which the ratio P1/P2 of the porosity P1 of S1 to the porosity P2 of S2 was outside of the numerical range of the present inventive concept.

Table 2 below shows moisture resistance characteristics and reliability of multilayer ceramic capacitors according to the porosity P1 of S1 and the ratio P1/P2 of the porosity P1 of S1 to the porosity P2 of S2 when an average thickness of side margin parts of the multilayer ceramic capacitors is 18 μm or less.

TABLE 2

| Sample No. | Average Thickness of Side Margin Parts (μm) | Porosity P1 of Region S1 | Ratio P1/P2 of Porosity of Region S1 to Porosity of Region S2 | Evaluation of Moisture-Resistance Characteristics | Reliability Evaluation (Number of Cracks/Total Number) |
|---|---|---|---|---|---|
| 7 | 4.5 | 2 | 2.3 | ○ | 0/200 |
| 8 | 6.2 | 1.3 | 7.8 | ○ | 0/200 |
| 9 | 10.3 | 1.5 | 6.9 | ○ | 0/200 |
| 10 | 7.6 | 10.2 | 2.5 | ○ | 0/200 |
| 11 | 4.5 | 8.4 | 3.4 | ○ | 0/200 |
| 12 | 9.2 | 5.8 | 4.1 | ○ | 0/200 |
| *13 | 7.6 | 0.56 | 3.3 | x | 1/200 |
| *14 | 4.5 | 0.9 | 5.0 | x | 3/200 |
| *15 | 9.2 | 0.82 | 11.2 | x | 3/200 |
| *16 | 8.9 | 6.5 | 1.4 | x | 5/200 |
| *17 | 9.3 | 5.6 | 1.7 | x | 3/200 |
| *18 | 5.6 | 9.2 | 0.6 | x | 3/200 |
| 19 | 13.5 | 4.2 | 2.3 | ○ | 0/200 |
| 20 | 12.9 | 4.5 | 2.5 | ○ | 0/200 |
| 21 | 12.1 | 4.2 | 4.1 | ○ | 0/200 |
| 22 | 8.9 | 6.5 | 3.4 | ○ | 0/200 |
| 23 | 9.3 | 20.0 | 3.3 | ○ | 0/200 |
| 24 | 5.6 | 9.2 | 5.0 | ○ | 0/200 |
| 25 | 7.6 | 18.4 | 5.7 | ○ | 0/200 |
| 26 | 4.5 | 5.8 | 6.7 | ○ | 0/200 |
| 27 | 9.2 | 16.5 | 14.2 | ○ | 0/200 |
| *28 | 13.5 | 0.82 | 1.32 | x | 2/200 |
| *29 | 12.9 | 0.52 | 1.09 | x | 4/200 |
| *30 | 12.1 | 0.38 | 0.97 | x | 4/200 |

*Comparative Example

In Table 2, the moisture-resistance characteristics were evaluated by mounting 200 chips on a substrate under a moisture condition of 8585 (85° C., 85% humidity), and the reliability was evaluated by whether or not a crack occurred at the time of break down analysis after the chips were polished. Specifically, after the chips were immersed in a Pb bath at 320° C. for 2 seconds, a test for determining whether or not a thermal shock crack occurred was performed.

In Table 2, cases in which the moisture-resistance characteristics were excellent are indicated by "○," and cases in which the moisture-resistance characteristics were poor are indicated by "x."

It may be appreciated from Table 2 that in the case in which the porosity P1 of S1 satisfies 1≤P1≤20, and the ratio P1/P2 of the porosity P1 of S1 to the porosity P2 of S2 satisfies P1/P2>2, the moisture-resistance characteristics are improved, and the reliability is also improved.

As set forth above, according to the embodiments of the invention, a multilayer ceramic capacitor having high reliability and high capacitance may be realized by controlling the porosity in the boundary surface between the cover layer and the side margin part in the ceramic body to alleviate external impacts such as thermal shock, electrolysis shock, or the like.

In addition, in the multilayer ceramic capacitor, the distance from the edges of the internal electrode to the first side surface or the second side surface may be short. Therefore, the overlap area of the internal electrodes formed in the ceramic body may be relatively large.

Further, the distance from the edges of the uppermost or lowermost internal electrode to the first side surface or the second side surface is significantly short, so that the removal of residual carbon may be facilitated. Therefore, concentration distribution of the residual carbon may be uniform to allow the micro structure of the internal electrode to be uniform, and the connectivity of the internal electrode may be improved.

In addition, the shortest distance from the edges of the uppermost or lowermost internal electrode to the first side surface or the second side surface may be secured to have a predetermined thickness so that the moisture-resistance characteristics may be improved, and internal defects may be significantly decreased. Further, when the external electrodes are formed, possibility of occurrence of cracks may be decreased, and mechanical strength against external impacts may be secured.

According to the embodiments of the invention, the plurality of first and second internal electrodes and the ceramic green sheets may be simultaneously cut, such that the edges of the internal electrode may be positioned in a single straight line. Then, the surfaces to which the edges of the internal electrode are exposed may be provided with the first and second side margin parts. The thickness of the side margin part may be easily controlled according to the amount of the ceramic slurry.

The internal electrodes may be entirely formed in the width direction of the dielectric layer, such that the overlap area between the internal electrodes may be easily secured and the generation of steps caused by the internal electrodes may be decreased.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor comprising:
   a ceramic body having first and second side surfaces opposite to each other, and third and fourth end surfaces connecting the first and second side surfaces;
   a plurality of internal electrodes formed in the ceramic body and having one ends thereof exposed to the third or fourth end surface; and
   first and second side margin parts formed from the first and second side surfaces to respective edges of the internal electrodes, the first and second side margin parts having an average thickness of 18 μm or less, wherein when a boundary surface between a cover layer and the first or second side margin part in the ceramic body is divided into two regions in a thickness direction of the ceramic body, a region adjacent to the internal electrode is S1, and a porosity of S1 is P1, $1 \leq P1 \leq 20$ is satisfied.

2. The multilayer ceramic capacitor of claim 1, wherein the first and second side margin parts are formed of ceramic slurry.

3. The multilayer ceramic capacitor of claim 1, wherein the plurality of internal electrodes include:
   a first internal electrode having one end exposed to the third end surface and the other end spaced apart from the fourth end surface by a predetermined interval; and
   a second internal electrode having one end exposed to the fourth end surface and the other end spaced apart from the third end surface by a predetermined interval.

4. A multilayer ceramic capacitor comprising:
   a ceramic body having first and second side surfaces opposite to each other, and third and fourth end surfaces connecting the first and second side surfaces;
   a plurality of internal electrodes formed in the ceramic body and having one ends thereof exposed to the third or fourth end surface; and
   first and second side margin parts formed from the first and second side surfaces to respective edges of the internal electrodes, the first and second side margin parts having an average thickness of 18 μm or less,
   wherein when a boundary surface between a cover layer and the first or second side margin part in the ceramic body is divided into two regions in a thickness direction of the ceramic body, a region adjacent to the internal electrode is S1, a region adjacent to an upper surface or a lower surface of the ceramic body is S2, a porosity of S1 is P1, and a porosity of S2 is P2, $P1/P2>2$ is satisfied.

5. The multilayer ceramic capacitor of claim 4, wherein the first and second side margin parts are formed of ceramic slurry.

6. The multilayer ceramic capacitor of claim 4, wherein the plurality of internal electrodes include:
   a first internal electrode having one end exposed to the third end surface and the other end spaced apart from the fourth end surface by a predetermined interval; and
   a second internal electrode having one end exposed to the fourth end surface and the other end spaced apart from the third end surface by a predetermined interval.

7. A method of manufacturing a multilayer ceramic capacitor, the method comprising:
   preparing a first ceramic green sheet including a plurality of stripe shaped first internal electrode patterns having a predetermined interval therebetween and a second ceramic green sheet including a plurality of stripe shaped second internal electrode patterns having a predetermined interval therebetween;
   forming a ceramic green sheet multilayer body by stacking the first and second ceramic green sheets while allowing the stripe shaped first internal electrode patterns and the stripe shaped second internal electrode patterns to intersect with each other, and forming a cover layer by stacking a plurality of ceramic green sheets on at least one of an upper surface and a lower surface of the ceramic green sheet multilayer body;
   cutting the ceramic green sheet multilayer body into multilayer bodies while traversing the stripe shaped first and second internal electrode patterns such that first and second internal electrodes have a uniform width, each multilayer body having side surfaces to which edges of the first and second internal electrodes are exposed in a width direction of the multilayer body; and
   forming first and second side margin parts on the side surfaces to which the edges of the first and second internal electrodes are exposed, respectively, by using ceramic slurry,
   wherein the first and second side margin parts have an average thickness of 18 μm or less, and
   when a boundary surface between the cover layer and the first or second side margin part in the multilayer body is divided into two regions in a thickness direction of the multilayer body, a region adjacent to the internal electrode is S1, and a porosity of S1 is P1, $1 \leq P1 \leq 20$ is satisfied.

8. The method of claim 7, wherein in the forming of the ceramic green sheet multilayer body, a central portion of the stripe shaped first internal electrode pattern and the predetermined interval between the stripe shaped second internal electrode patterns are overlapped with each other.

9. The method of claim 7, wherein the cutting of the ceramic green sheet multilayer body includes:
   cutting the ceramic green sheet multilayer body into bar shaped multilayer bodies each having the side surfaces to which the edges of the first and second internal electrodes are exposed; and
   cutting a central portion of the first internal electrode and a predetermined interval between the second internal electrodes along the same cutting line to form the multilayer body having a third end surface and a fourth end surface to which one ends of the first and second internal electrodes are exposed, respectively, after the forming of the first and second side margin parts.

10. The method of claim 7, wherein the cutting of the ceramic green sheet multilayer body includes:
    cutting the ceramic green sheet multilayer body into bar shaped multilayer bodies each having the side surfaces to which the edges of the first and second internal electrodes are exposed; and
    cutting a central portion of the first internal electrode and a predetermined interval between the second internal electrodes in the bar shaped multilayer body along the same cutting line to form the multilayer body having a third end surface and a fourth end surface to which one ends of the first and second internal electrodes are exposed, respectively, before the forming of the first and second side margin parts.

11. The method of claim 7, wherein the forming of the first side margin part and the second side margin part is performed by applying the ceramic slurry to the side surfaces to which the edges of the first and second internal electrodes are exposed.

12. The method of claim 7, wherein the forming of the first side margin part and the second side margin part is performed by dipping the side surfaces, to which the edges of the first and second internal electrodes are exposed, into the ceramic slurry.

13. The method of claim 7, wherein when the boundary surface between the cover layer and the first or second side margin part in the ceramic green sheet multilayer body is divided into two regions in the thickness direction, a region adjacent to an upper surface or a lower surface of the ceramic green sheet multilayer body is S2, and a porosity of S2 is P2, $P1/P2>2$ is satisfied.

* * * * *